United States Patent
Spector

(10) Patent No.: US 6,517,351 B2
(45) Date of Patent: *Feb. 11, 2003

(54) VIRTUAL LEARNING ENVIRONMENT FOR CHILDREN

(76) Inventor: Donald Spector, 380 Mountain Rd., Union City, NJ (US) 07087

( * ) Notice: Subject to any disclaimer, the term of this patent is extended or adjusted under 35 U.S.C. 154(b) by 0 days.

This patent is subject to a terminal disclaimer.

(21) Appl. No.: 09/766,951

(22) Filed: Jan. 22, 2001

(65) Prior Publication Data

US 2001/0003040 A1 Jun. 7, 2001

Related U.S. Application Data

(63) Continuation-in-part of application No. 09/025,347, filed on Feb. 18, 1998, now Pat. No. 6,227,863.

(51) Int. Cl.[7] .............................. G09B 5/04
(52) U.S. Cl. .................. 434/169; 434/307 R
(58) Field of Search ................ 434/156–169

(56) References Cited

U.S. PATENT DOCUMENTS

| | | | | |
|---|---|---|---|---|
| 5,111,409 A | * | 5/1992 | Gasper et al. | 395/152 |
| 5,260,869 A | * | 11/1993 | Ferrier et al. | 364/413.01 |
| 5,387,104 A | * | 2/1995 | Corder | 434/156 |
| 5,692,906 A | * | 12/1997 | Corder | 434/156 |
| 5,741,136 A | * | 4/1998 | Kirksey et al. | 434/169 |
| 5,815,147 A | * | 9/1998 | Bogen et al. | 345/334 |
| 5,885,083 A | * | 3/1999 | Ferrel | 434/156 |
| 5,893,720 A | * | 4/1999 | Cohen | 434/327 |
| 5,957,699 A | * | 9/1999 | Peterson et al. | 434/350 |
| 5,974,262 A | * | 10/1999 | Fuller et al. | 395/838 |
| 6,227,863 B1 | * | 5/2001 | Spector | 434/167 |

* cited by examiner

Primary Examiner—Joe H. Cheng
Assistant Examiner—Kathleen M Christman
(74) Attorney, Agent, or Firm—Lieberman & Nowak, LLP

(57) ABSTRACT

A virtual learning system environment which provides for progressive education of children, at their own pace, through enhancement in both language arts (e.g. spelling, reading comprehension) and physical skills (interactive prompts). The system of this invention includes a microphone for sensing an audible word or command, a video camera for sensing bodily movement, and means for effecting a computer generated response to said audible word or command, or said bodily movement, wherein said response includes both graphical depiction of the letters of said audible word or command, an object image corresponding to bodily movement or said audible word or command, and an action or object related to said bodily movement or said audible word or command, or any combination thereof, so as to effect a progressive learning or teaching experience. The system also provides for direction to a pathway alternative to said system based upon a series of links, similar to the *Encarta* Encyclopedia, to web pages and the like, where it directs the child to additional sources of information concerning the one or more aspects of the learning exercise. In addition, the system allows for a live or computer mediator to monitor the progress of the learning experience.

6 Claims, 4 Drawing Sheets

VIRTUAL LEARNING ENVIRONMENT FOR CHILDREN

CROSS-REFERENCE TO RELATED APPLICATIONS

This application is a continuation-in-part of allowed U.S. application, Ser. No. 09/025,347, entitled Phonics Training Computer System For Teaching Spelling & Reading, filed Feb. 18, 1998, now U.S. Pat. No. 6,227,863.

BACKGROUND OF THE INVENTION

1. Field of the Invention

This invention relates to a system and method for self-teaching, including self-teaching of young children, including children having developmental disabilities. The system of this invention includes apparatus for sensing an audible word or command, or movement of a young child for effecting a computer generated response to said movement or said audible word or command, wherein said response can include a graphical depiction of the letters of said audible word or command, an object image corresponding to said movement or audible word or command and an action or object related to said audible word or command, or any combination thereof. More specifically, in the case of o lder children, the system may provide a series of links, similar to the *Encarta* Encyclopedia, to web pages on the Internet and the like, where it directs the child to additional sources of information concerning the subject of the learning exercise.

2. Description of the Prior Art

The main purposeful activity undertaken by young children is play. From a developmental perspective, play is often considered as practice for the child's later roles in life. Through play a child can explore the environment and gain knowledge regarding the physical laws governing objects, socialize with adults and peers to gain important interpersonal skills, and use his or her imagination and begin honing the pathways for conscious thought. Thus, it can be argued that play in humans is a tool leading to perceptual, conceptual, intellectual and language development, the basic building blocks required for the formulation of higher cognitive fimctions.

For healthy children, very early childhood play is either oriented toward physical objects or toward symbol manipulation. Meaningful verbalizations may not yet be possible. However, eventually through play, the child begins to attach specific names to objects. Soon afterwards, more complex sentences are learned and the child talks to himself or herself in order to achieve specific activities. Meaningful self-speech, when activity and verbalization merge and the child can say what he or she is doing, is believed to be a significant point in intellectual development. Self-speech is eventually made non-verbal, and we talk to ourselves through specific mental activities. This is often referred to as self-reflective activity and occurs throughout childhood and even adulthood. For self-reflective activity to occur, one must be able to recall and manipulate specific memory events. The brain system that this refers to is working memory which is theorized to have both a verbal/language component, a phonological loop, and a visual imagery component, the visuospatial sketch pad.

The child's brain is different from the adult brain in that it is a very dynamic structure that is evolving. A two year old child has twice as many synapses (connections) in the brain as an adult. The young brain must use these connections or lose them. Thus, failure to learn a skill during a critical or sensitive period has important significance. According to Dr. Michael Phelps, Chairman of the Department of Molecular and Medical Pharmacology of the UCLA School of Medicine, the learning experience of the child determines which connections are developed, and which will no longer function.

Dr. Patricia Kuhl, a Speech Scientist at the University of Washington, reports that babies are born "citizens of the world" in that they can distinguish differences among sounds (temporal, spectral and duration cues) borrowed from all languages. They are ready to learn any language they hear, but, by six months of age, they start to specialize in their native language.

Dr. Susan Curtiss, Professor of Linguistics at UCLA, who studies the way children learn languages, notes that in language development there is a window of opportunity in which the child learns that first language normally. After this period, the brain becomes slowly less plastic, and by the time the child reaches adolescence, the brain cannot develop "richly and normally any real cognitive system, including language."

It is known that the greatest period of intellectual development potential for a child is before the age of three. However, children do not normally start any formal education until age five or six, and infants typically in an ideal family only receive one to two hours of daily intellectual stimulation.

It would, thus, be advantageous to provide a virtual play and educational environment for children, including those children whose learning experiences have not been adequately developed, or for medical reasons have been slow to develop. Such a virtual educational environment would be advantageous for several reasons: developmental milestones may be achieved more quickly; the child may learn to distinguish between images and scenes created from multiple images; and it may give the child a vehicle for self-reflective activity and thus be a seed for the development of imagination, consciousness, and communication. One such virtual learning environment system is described in U.S. Pat. No. 5,815,147 (to Bogen, et al. issued Sep. 29, 1998).

Notwithstanding the advances set forth in Bogen, et al, i.e., virtual play environment, the potential of such environment has been limited by its focus on children with limited interactive capabilities, and the fact that interacting is pre-progammed and not based on the child's spontaneous behavior. Clearly the potential of such a system, which has yet to be more fully realized either by both children with special needs, or by children not similarly encumbered, has not been filly realized because of such limited focus (children with learning or physical disabilities). Thus, the Bogen, et al, system is inherently limited because of its failure to provide adequate interaction of the child with the virtual play environment through the use of multiple interactive input; and, a more varied or comprehensive set of learning objectives (lessons) to retain the child's interest. Accordingly, there continues to exist a need for such enhancement so as to provide a learning environment wherein each child, including those with limited physical and/or emotional development, can cause the environment to react with it in some meaningful and responsive way; and, encourage the child to look beyond a possible limited learning environment to related subjects in alternative sources of such information.

OBJECTS OF THE INVENTION

It is the above and related objects of this invention to remedy the above as well as related deficiencies in the prior art.

More specifically, it is the principal object of this invention to provide a virtual learning environment system which is both interactive, and responsive to a user's prompting by any one of a number of commands or input, including voice and physical movement.

It is another object of this invention to a provide virtual learning environment system wherein the system is responsive to multiple inputs from the user.

It is yet another object of this invention to a provide virtual learning environment system wherein the system encourages or trains the user to provide successive multiple inputs, as part of a progressive learning experience.

It is still yet anther object of this invention to a provide virtual learning environment system wherein the system directs the user to a pathway alternative to said system based upon said multiple inputs from the user.

SUMMARY OF THE INVENTION

The above and related objects are achieved by providing a virtual learning system environment which provides for the progressive education of children, at their own pace, through enhancement in both language arts (e.g. spelling, reading comprehension) and physical skills (interactive prompts). The system of this invention includes a microphone and video camera for sensing an audible word or command, or user movement, and means for effecting a computer generated response to said audible word or command, or user movement, wherein said response includes both graphical depiction of the letters of said audible word or command, an object image corresponding to said audible word or command and an action or object related to said user movement, or said audible word or command, or any combination thereof, so as to effect a progressive learning or teaching experience.

The inventive system specifically includes use of a video camera, focused, for example, on an infant in a crib or at play. Motions of the infant are detected by the video camera and may be utilized by an associated computer to create and/or manipulate objects on a video monitor visable to the infant. Thus, for example, the infant will be able to manipulate objects in a virtual environment to enhance his or her motor skills.

The system also provides for a mediator which, for example, could monitor the infant's learning progress via the Internet and have the ability to modify the software associated with the infant's computer to modify the learning process depending on the progress of the infant user.

The system may also provide direction to a pathway alternative to said system based upon said learning progress. More specifically, in the case of older children, the system may provide a series of links, similar to the *Encarta* Encyclopedia, to web pages and the like, wherein it directs the child to additional sources of information concerning one or more aspects of the learning exercise.

In the preferred embodiments of this invention, the system includes multiple and interactive modules for receiving and responding to input information (hereinafter also "cues" or "user queries"), in the form of audible sound commands and visual images, from the user (child). In each instance, the combination of cues are processed by the system and converted to digital information that can either provide voice and image response, or voice and animation, or voice and animation and integration/display of a real image of a toy or the user within a virtual environment generated by the system, or any combination thereof.

The virtual learning system environment can be biased to teach a particular skill (e.g. spelling), or the child can be allowed to select his/her preference in a particular area. In each instance, the preference could be pre-set to provide a corresponding response in a learning format geared to the preference. The spelling preference would, thus, be responsive to the child saying a word, which would then be displayed as the object along with the correct letter spelling of the word. Where the child's use of a word referred to something personal to the child (e.g. head, leg, etc.) the display could add camera input (a picture of the child's head) to the video monitor in order to both illustrate the object and to develop a sense of the child's appreciation of its own physical being.

The responses to the audible and visual cues provided by the system could be pre-set by the parent or a remote mediator, based upon the skill or lesson the parent or mediator desired to develop or measure. It is emphasized that the system is responsive to multiple cues or prompts from the user, so that if, for example, the parent or mediator desired to test or evaluate the child's comprehension and physical coordination, the lesson could involve the child putting on or taking off an item of clothing. Thus, the child could be asked to both follow verbal commands and perform a physical task. The image of the child could be inserted on a doll, and instructed to dress or undress the doll on the video display. Thus, the child's ability to comprehend and follow simple directions could be taught and/or evaluated. Similarly, basic math skills (e.g. counting) could also be taught. The combination of both audible and visual input, and corresponding feedback from the virtual learning system, would, thus, not only provide a more realistic teaching environment, but also increase the child's interaction with the system, a critical factor in teaching children, including those children whose attention span may be limited.

DETAILED DESCRIPTION OF THE INVENTION INCLUDING PREFERRED EMBODIMENTS

The Virtual learning environment system of this invention is an improvement to commonly assigned U.S. patent application, Ser. No. 09/025,347, filed Feb. 18, 1998, to Spector entitled Phonics Training Computer System For Teaching Spelling & Reading, now U.S. Pat. No. 6,227,863, which is herein incorporated by reference in its entirety.

Figure 1:
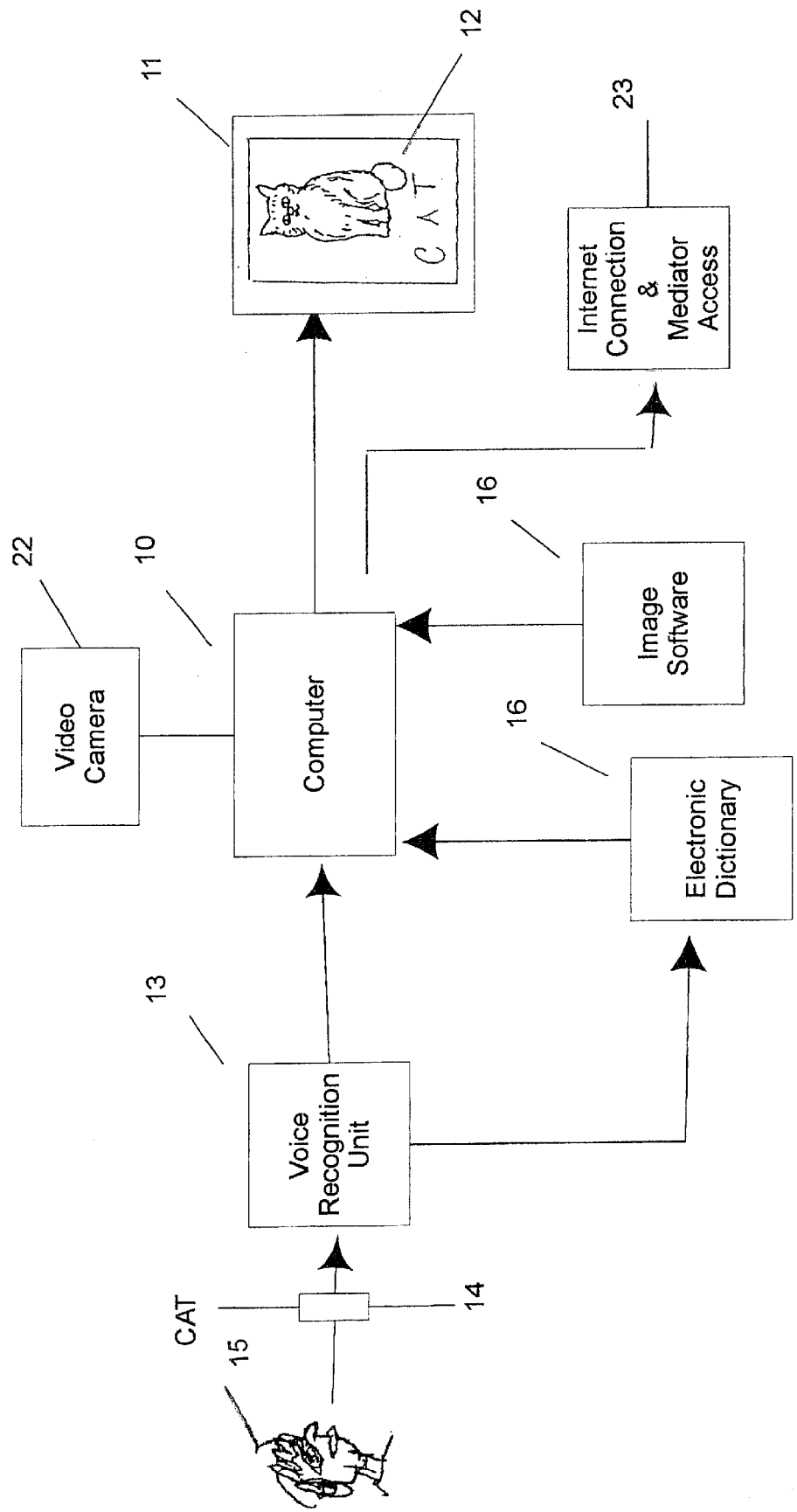
FIG. 1 depicts the virtual learning environment system of this invention.

The virtual learning environment system of this invention is shown in FIG. 1. In its simplest form, the system comprises a general-purpose programmable computer, such as personal computer 10, a visual display device 12 (preferably a touch screen visual display device), and appropriate input/output devices such as a microphone and/or speaker, a keyboard, a mouse, and a video camera 22, and could also include a single switch input device (joy stick). Computer 10 also has access to the Internet via Internet access port 23. Depending upon the age and the extent of the user's physical abilities, either the touch screen video display device, microphone, the keyboard, mouse, or joy stick, or any combination thereof, may be employed as one means for selecting and manipulating objects shown on the display. In the preferred embodiment of the virtual learning environment illustrated herein, the computer 10 is programmed to provide a non-directed play environment for the user in the form of real or simulated images.

Referring now to FIG. 1, illustrated therein is an educational system in accordance with the invention that includes a digital computer 10 having a central processing unit (CPU). The output of computer 10 is coupled to a video monitor or terminal 11 having a screen 12 on which may be presented the letters of the alphabet which spell a word spoken into the system by a pre-school child, generated an image of the object identified by this word, or visual images of the child generated by video camera 22.

In the input of computer 10 is a peripheral in the form of a voice recognition unit 13 coupled to a microphone 14. When a pre-school child (or other speaker) speaks into microphone 15, unit 13 then recognizes the distinctive pattern of sounds in the voice of the child, and converts these sounds into digitized signals that are fed into computer 10 and processed therein.

Associated with computer 10 may be an electronic phonetics dictionary 16. Digitally stored in the electronic phonetics dictionary are both the phonetic sounds which constitute the words contained in the dictionary and the alphabetic letters which spell each word. The contents of this dictionary are downloaded into the memory of the computer.

The voice recognition unit 13 is operatively coupled to the electronic phonetics dictionary so as to condition this dictionary to render it responsive to the distinctive voice pattern of the child using the system. Thus, while the phonetic sounds of the words digitally stored in the electronic dictionary are synthetically generated sounds, not sounds derived from a human voice, the dictionary must be able to compare a word spoken by a pre-school child with the same word stored in the dictionary. In order to be able to do so, before the child uses the system to spell words, he first speaks for a few minutes into the voice recognition unit to permit the unit to analyze the voice of the child and then recognize its unique pattern.

We shall assume the electronic dictionary has digitally stored therein a vocabulary of words and also the letters of the alphabet which spell each word. When a child speaks into the input of the computer the word CAT, the computer then scans the words in the dictionary to find the stored digitized sounds of the word CAT yielded by the voice recognition unit 13.

Figure 2:
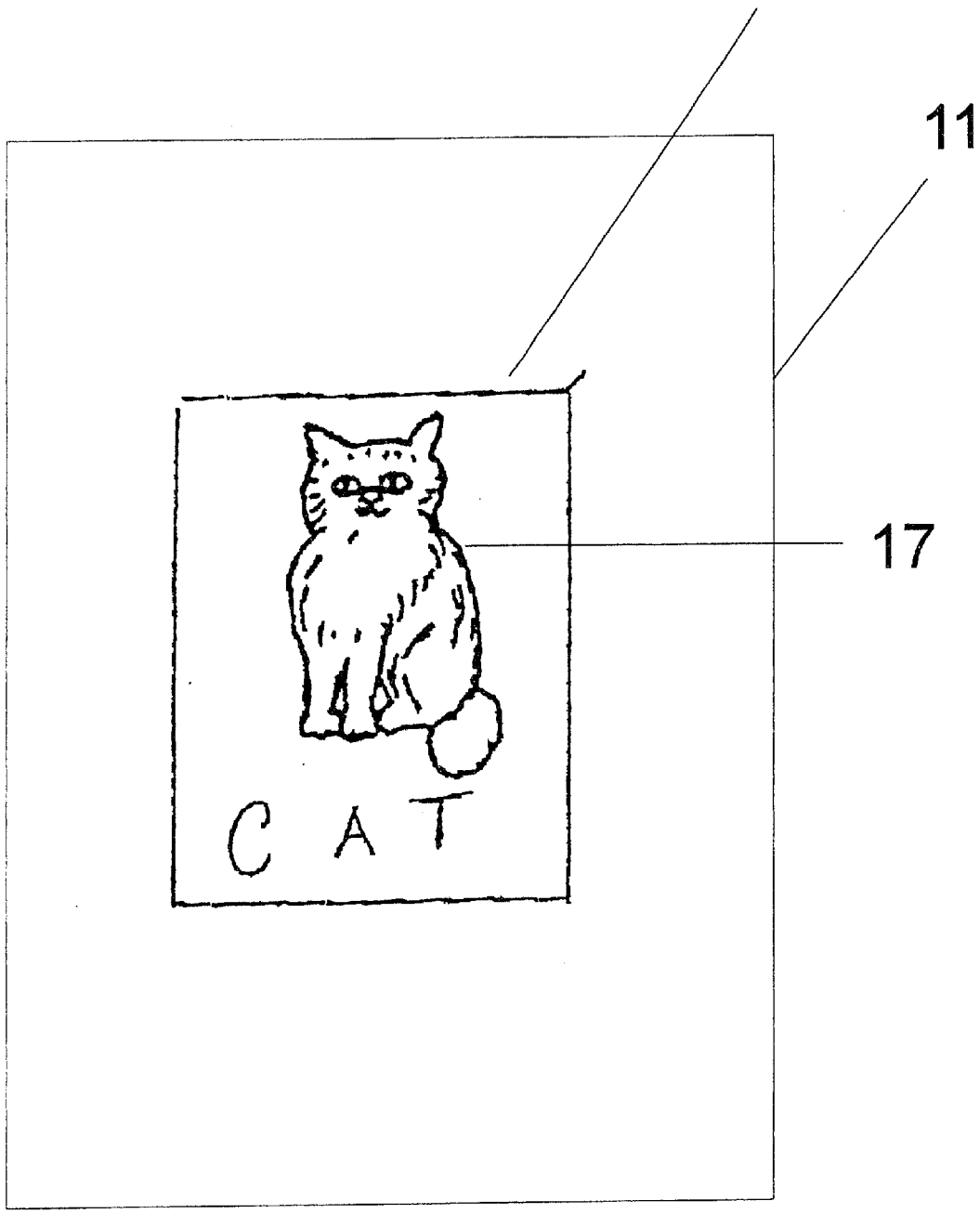
FIG. 2 depicts the screen of a computer terminal to be used in conjunction with the present invention.
Figure 3:
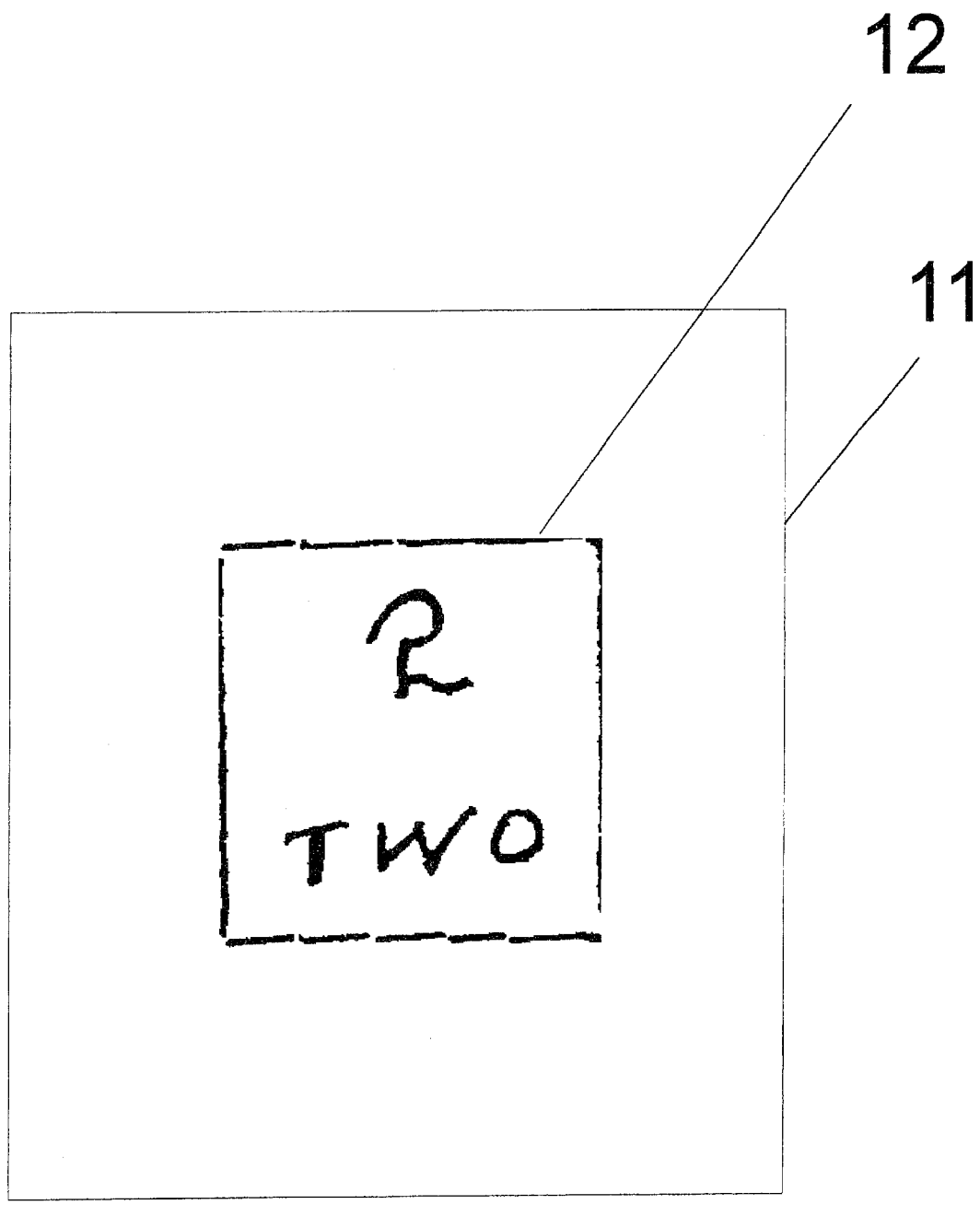
FIG. 3 depicts a second example of the screen of FIG. 2.

When a match is found by the computer, then the letters of the word CAT yielded in the output of the computer are presented on screen 12 of the computer terminal 11, as shown in FIG. 2. Hence, the child can see how the word he has just spoken into the computer is spelled.

Also associated with computer 10 is an image software module 15, having stored therein a library of digitized images, each being a picture or drawing of an object identified by a respective word included in the vocabulary of the electronic dictionary. Thus, if the dictionary contains the word DOG, CAT, BOY, HOUSE and BOTTLE in the image library, there will be a picture or drawing of each of these objects.

When computer 10 responds to an incoming word, such as CAT, and presents on screen 12 the spelling of CAT, it at the same time presents on the screen an image 17 of a cat, as shown in FIG. 2.

Thus, whatever word is spoken into the input of the computer by a child using the system which identifies an object, this causes the computer to yield in its output terminal the letters spelling this word, and an image of the object identified thereby.

In this way, a pre-school child using the system is taught how to spell the words which are included in his vocabulary, while seeing for each word an image of the object presented by the word. This serves not only to impress on the child's mind the spelling of the word, but also serves to clarify its meaning. Thus, if a pre-school child is confused as to the distinction between the words BOY and BOOK, when he says the word BOOK and then sees a book on the screen, he knows that a book is not a boy.

In practice, the system need not be confined to words that are nouns and identify objects, for the system can include verbs and adjectives commonly used by pre-school children, such as RUN, JUMP, BIG and LITTLE. In order to illustrate these verbs and adjectives, the image software 15 must include appropriate illustrations. Thus, RUN can be illustrated by a child running, BIG by a giant and SMALL by a midget.

One may use as images cartoon characters that most children are familiar with, having seen them on TV shows for children. Thus, PLUTO®, the Disney character, can be used to represent a dog, and DONALD DUCK® to represent a duck.

It is also useful for teaching pre-school children to spell and read, to include arithmetic numbers such as the digits one to ten, and how these digits are spelled. When children learn how numbers are spelled, they can read stories that refer to "three bears" or "five chairs."

In the learning process, it is desirable when a child is shown how to spell a word, that he then be required to spell the word aloud, for in doing so, one then knows whether the child has learned the spelling.

The system may be modified to test the pre-school child to determine whether he remembers how a word is spelled. Thus, after a child sees how the word CAT is spelled on screen 12, he may then be requested to speak into the microphone how this word is spelled by saying the letter C, then the letter A, and finally the letter T.

In accordance with the invention, there is also included video camera 22, which can, for example, be focused on an infant in his or her crib. Movements from the infant can be detected by the video camera, digitized and applied to computer 10. Those movements, which initially may be random, can be utilized to allow the infant to begin to learn how to manipulate objects in a virtual environment. For example, if the infant initially moves his or her arm, this could result in movement of an object in the virtual environment causing the object to be moved from a first location to a second location depending on the particular movement of the infant. As the infant would continue to make random movements, there would be provided feedback from video monitor 11, which would indicate to the infant a positive indication of the correct movement to move a particular object in the virtual environment. In this manner, the infant would gradually learn the movements required to move objects in the virtual environment.

The invention also provides for a mediator to monitor the user's progress via connection to the Internet. For example, if the infant user successfully accomplished a particular task, the system could be modified to provide a new task for the user, or alternatively provide feedback to a caregiver on the progress of the infant user.

In addition, the connection to the Internet could also be used to provide additional information to be displayed on video monitor 11.

In the teaching system shown in FIG. 1, a child sees on the screen of the computer terminal the spelling of the word he has spoken into the computer and an image of the object identified by this word. But, the system depends on the ability of the child to speak into the computer the many words he knows, yet there is nothing to spur the child to speak words he uses infrequently. Thus, it may not occur to the child to speak the word BEAR or COW, for he rarely has occasion to use these words even though he knows them.

Figure 4:
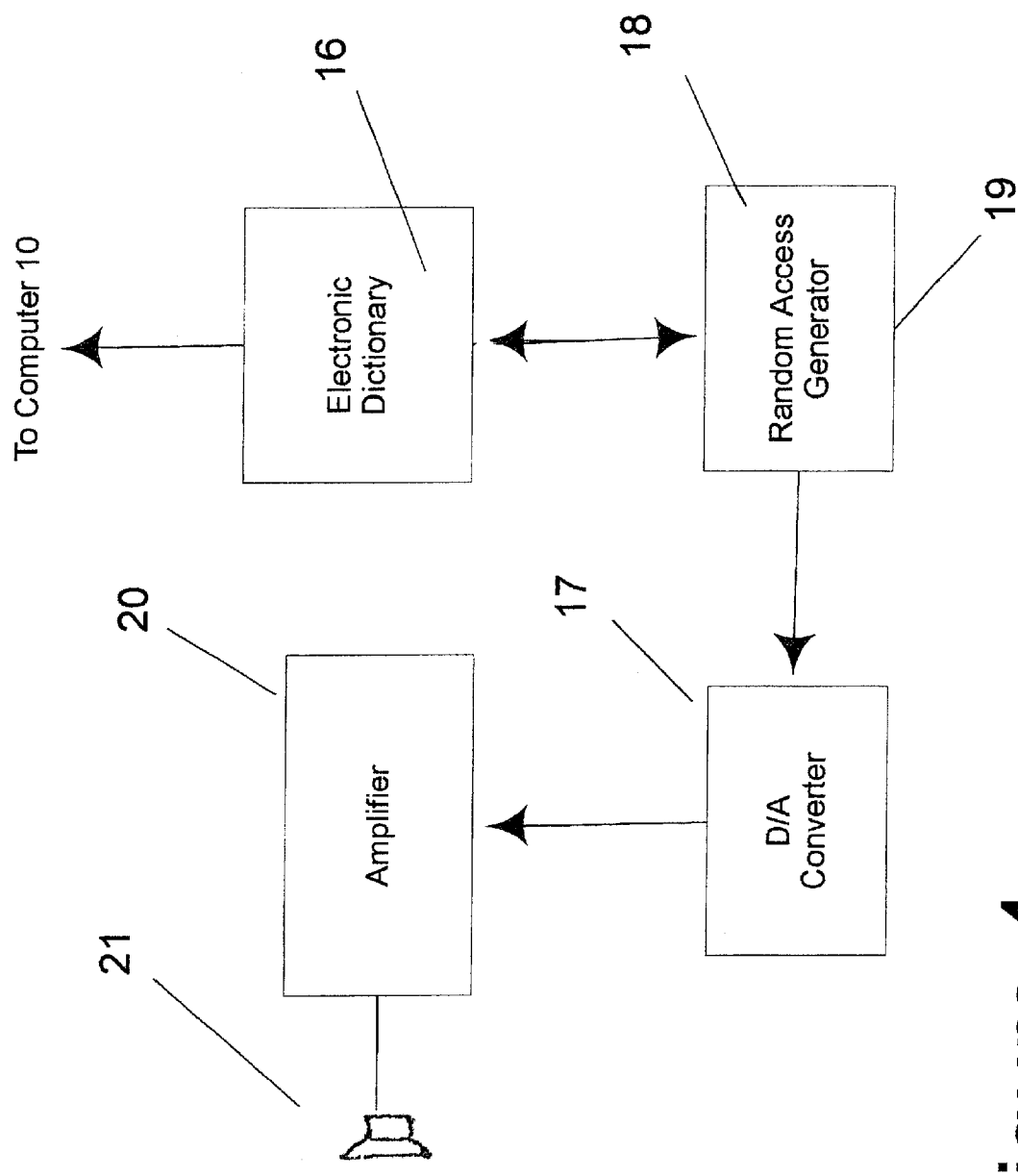
FIG. 4 is a modified version of one embodiment of the invention.

In order, therefore, for the child to exploit all of the words phonetically stored in the electronic dictionary 11, in the embodiment shown in FIG. 4, associated with this dictionary is a random access selector 18 operated by a button 19, which may be actuated by the child or a caregiver using the system.

When the child or caregiver presses button 19, selector 18 then chooses at random the stored digitized sounds of one of the words in the dictionary, say BEAR, and feeds those sounds to an analog-to-digital converter D/A. The converter yields an analog signal of BEAR. This signal is amplified in analog amplifier 20, and then reproduced by a loud speaker 21.

Thus, each time the child or a caregiver presses button 19, he or she hears a word randomly selected from the phonics dictionary. Because the child does not know what word to expect, this lends interest to this operation. The child must then speak the word he has just heard into the computer input, so that he can now see how it is spelled and what object it identifies.

Thus, the child may not have in his working vocabulary the word BOAT. But, when he hears this word extracted from the dictionary and speaks it into the computer, the child is then informed as to the meaning of this word by an image of a boat and how it is spelled.

In this way, the child is encouraged to explore the entire electronic dictionary rather than only those words that come to mind when using the training system.

Alternatively, one may provide a dedicated computer in whose memory is stored the electronic dictionary and the library of digitized images to provide a self-sufficient and compact device for home use by a pre-school child, or for use in an elementary school.

If, in the first grade of an elementary school, the students are given a simple story book to read, the dedicated computer in its electronic dictionary can include all of the words in the book except for articles and propositions. In this way, a child who masters the spelling of the words in the electronic dictionary will experience no difficulty in reading the book.

The advantage of using the system to teach spelling to an individual child, rather than having a teacher address a group of students in a classroom, is that the system operates at a pace governed by the child using it. Thus, the child can dwell as long as he wishes on the spelling of a particular word before he speaks another word into the computer.

While there has been shown and described preferred embodiments of an educational training system, it will be appreciated that many changes and modifications may be made therein without, however, departing from the essential spirit thereof.

What is claimed is:

1. A virtual learning system adapted to teach a child having a limited vocabulary of words to increase that vocabulary, said system comprising:

a computer having an output terminal provided with an audio speaker;

an electronic dictionary associated with the computer in which is digitally stored the phonetic sounds of the words in the vocabulary that identify letters of the alphabet that spell each word;

means including a voice recognition unit in the input of said computer, the unit acting to recognize the distinctive sound pattern of the child speaking into the unit and to condition the phonetic dictionary to respond to this pattern, whereby when the child speaks into the unit a specific word identifying a particular object, the output of the unit is digitized and the computer then acts to scan the dictionary to find the corresponding phonetic sounds digitally stored therein, and when a match is found to audibly present the specific word.

2. The virtual learning system of claim 1 which includes means to monitor the educational process of said user of said virtual learning system.

3. The virtual learning systems of claim 2 wherein said monitor means further includes means to modify said central system learning environment based on progress of said user.

4. The virtual learning system of claim 1 wherein said user is an infant incapable of both language capability and motor skills for manipulating physical objects.

5. The virtual learning system of claim 1 wherein said electronic dictionary can be accessed via the Internet.

6. The virtual learning system of claim 2 wherein the means to monitor the educational progress of said user includes an individual who can remotely direct modifications of said virtual learning systems based on the progress of said user.

* * * * *